Dec. 8, 1942.  M. MAGYARI  2,304,265
GAUGE SLIDE
Filed Feb. 4, 1942
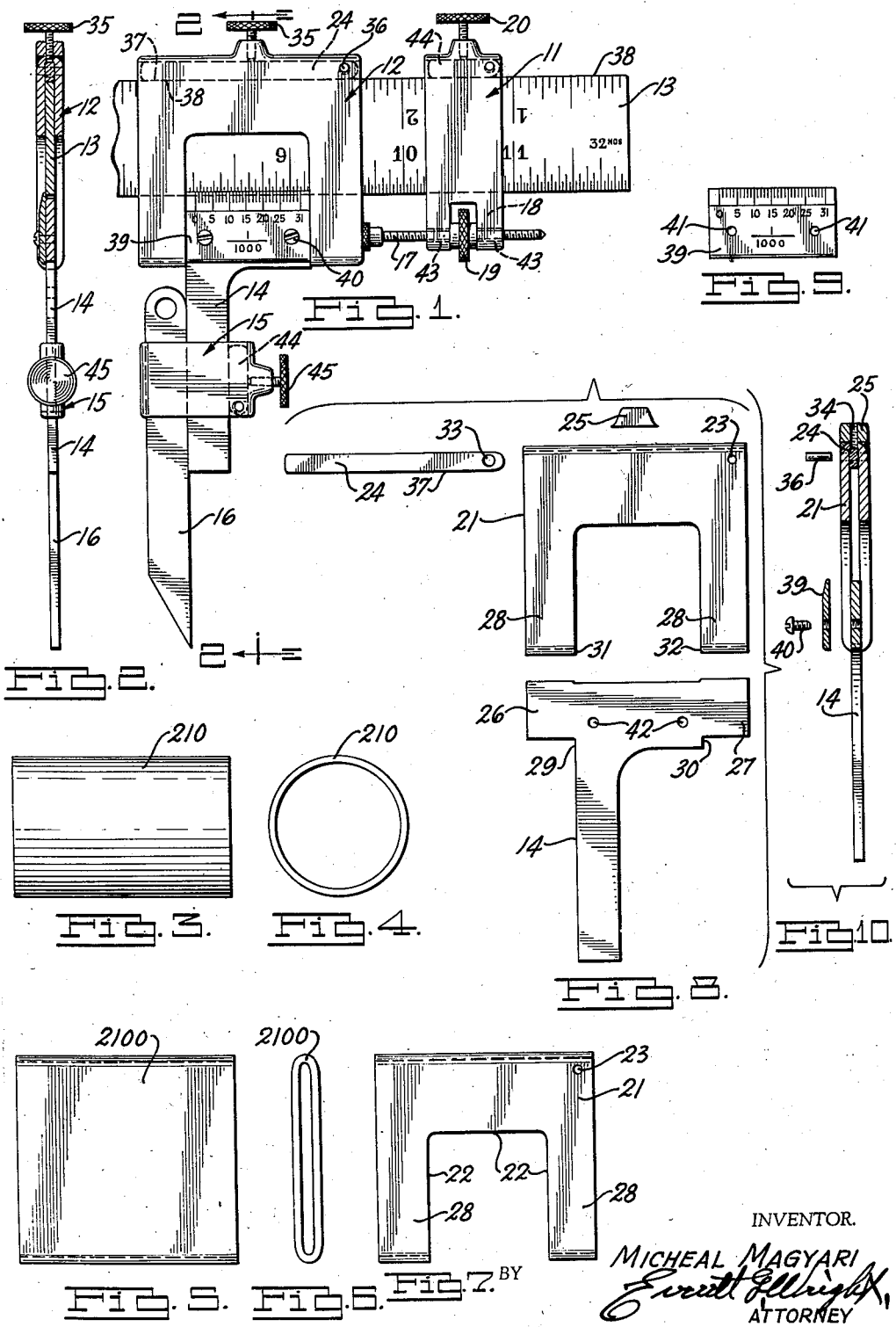
INVENTOR.
MICHEAL MAGYARI
BY
ATTORNEY Patented Dec. 8, 1942

2,304,265

UNITED STATES PATENT OFFICE 2,304,265

GAUGE SLIDE

Micheal Magyari, Detroit, Mich., assignor of one-half to Anthony Messana, Detroit, Mich.

Application February 4, 1942, Serial No. 429,460

3 Claims. (Cl. 33—143)

This invention relates to slides of the type employed on height gauges, depth gauges, beam compasses and the like and to an economical and facile method of manufacturing the same.

Slides for height gauges and the like are usually made up of a number of parts accurately machined, drilled and riveted or screwed together and include accurately machined and fitted clamping bars which secure the slides in any desired position along the beam or the like over which the slides are telescoped. Because of the type of construction and expense of manufacture, the cost of height gauges, depth gauges, beam compasses and the like is so high that the skilled mechanic generally cannot afford to have such instruments in his tool kit.

With the foregoing in view, one object of the invention is to provide a rugged, easy to manufacture gauge slide made of a few simple parts which may be produced at such a cost as will enable machinists and die makers generally to include height gauges, depth gauges, beam compasses, and the like in their tool kits.

A further object of the invention is to provide a novel and economical method of manufacturing gauge slides which requires a minimum of parts and which produces extremely rigid construction.

Other objects of the invention will become apparent by reference to the accompanying detailed description taken in connection with the accompanying drawing, in which:

Fig. 1 is a fragmentary view of a gauge employing a vernier scribing slide constructed in accordance with the invention.

Fig. 2 is a sectional view taken on the line 2—2 of Fig. 1 looking in the direction indicated by the arrows.

Figs. 3 and 4 are side and end elevational views respectively of a tubular blank from which the main body of a slide element is formed.

Figs. 5 and 6 are side and end elevational views respectively showing the tubular blank shown in Figs. 3 and 4 flattened into the main body of a slide element.

Fig. 7 is a side elevational view of the main body of a slide element shown in Fig. 4 after a combined notching and punching operation has been performed thereon.

Fig. 8 is an exploded view showing the major parts of a slide element ready for sub-assembly.

Fig. 9 is an elevational view of a vernier which may be employed on a slide element.

Fig. 10 is a vertical sectional view of the slide element having parts as disclosed in Figs. 8 and 9 partially assembled and ready for final assembly.

Referring now to the drawing wherein like numerals refer to like and corresponding parts throughout the several views, Fig. 1 discloses generally an anchorage slide 11 and vernier slide 12 disposed on a beam or the like 13 which, in the particular construction shown, happens to be a machinist's rule. The vernier slide 12 is constructed with a tongue 14 to accommodate a securing slide 15 employed to fix a scribe bar 16 or the like to the vernier slide 12. Obviously a compass point or the like may be substituted for the scribe bar 16. A threaded adjusting bar 17 may be fixed to the vernier slide 12, telescoped through the anchorage slide 11 at the filler 18, and threaded through an adjusting nut 19 as best shown in Fig. 1 to enable the said vernier slide 12 to be moved minutely in either longitudinal direction along the beam or the like 13 with respect to the anchorage slide 11 when the said anchorage slide 11 is fixed with respect to the said beam or the like 13 by the set screw 20 of the said anchorage slide 11. Inasmuch as the instant invention relates to slide construction and the method of manufacturing the same, the invention will be described by particularly referring to the vernier slide 12, however and obviously, the anchorage slide 11 and securing slide 15 may be and are preferably constructed in a like and similar manner to the construction of the vernier slide 12.

The said vernier slide 12 is preferably composed of a body portion 21 formed from a tubular blank 210 shown in Figs. 3 and 4 flattened to a loop 2100 as shown in Figs. 5 and 6 which is then sheared along the lines 22 and apertured at 23 as to provide the completed body portion 21 shown in Fig. 7.

Referring now to Fig. 8, the body portion 21 of the vernier slide 12 is shown along with the combined T-shaped filler and tongue 14, the pivot lock bar 24, and the set screw nib 25 ready for the initial sub-assembly operation. The T-shaped filler and tongue member 14 is formed of metal slightly thicker than the beam or the like 13 in such proportions that the ends 26 and 27 of the transverse portion thereof as viewed in Fig. 8 become disposed in the looped ends 28 of the body portion 21; the edges 29 and 30 of the said T-shaped filler and tongue member 14 become disposed against the edges 31 and 32 respectively of the looped ends 28 of the body portion 21. In such position, the said T-shaped filler and tongue member 14 is brazed within the looped ends 28 of the body portion 21. The pivot lock bar 24 is preferably made of metal substantially the same thickness as the beam or the like 13 and the aperture 33 therethrough is slightly larger in diameter than the aperture 23 through the main body portion 21.

The set screw nib 25 is preferably brazed on the top of the body portion 21 as viewed in Fig. 8, and the nib 25 and body portion 21 are drilled and tapped at 34 as best shown in Fig. 10 to accommodate a set screw 35 as indicated in Figs. 1 and 2. A pin 36 tightly fitting through the aperture 23 in the body portion 21 extends through the aperture 33 in the end of the pivot lock bar 24 and pivotly secures the same in the said body portion 21 with sufficient play to permit the edge 37 of the lock bar 24 to bear against the edge 38 of the beam or the like 13 when the set screw 35 is tightened. The vernier scale 39 is secured to the transverse portion of the T-shaped filler and tongue member 14 by means of screws 40 threaded through registering threaded apertures 41 and 42 in the vernier scale 39 and the said transverse portion of the T-shaped filler and tongue member 14 respectively.

The anchorage slide 11 is constructed in substantially the same manner as the vernier slide 12 except that it is narrower and shorter, except that a U-shaped filler 18 is employed instead of the T-shaped filler and tongue member 14, and except that the said anchorage slide 11 is drilled at 43 to admit of the adjusting bar 17 being telescoped therethrough. The lock bar 44 of the anchorage slide 41 is shorter than the lock bar 24 of the vernier slide 12.

The securing slide 15 is constructed in substantially the same manner as the anchorage slide 11 except that it is narrower than the anchorage slide 11 and employs no filler, the lock bar 44 thereof being employed to tighten the scribe bar 16 edgewise against the tongue portion of the tongue member 14 as best shown in Fig. 2 when the set screw 45 is tightened.

The invention provides an instrument slide employing a semi-floating semi-pivotal lock bar pinned in a body member formed of a single piece of tubing flattened to the desired wall spacing and cut to the desired shape. The employment of a nib to fill out the tubular body portion at the edge thereof to provide necessary thickness of metal to accommodate threads for set screws assures essential strength at the otherwise weakest point. The method of manufacture and construction provides a rigid, inexpensive and practical instrument slide for low cost precision tools and instruments such as height gauges, depth gauges, beam compasses and the like.

Although but one embodiment of the invention and two modifications thereof and a single method of manufacturing the same have been shown in the drawing and described in detail, it is obvious that a wide range of equivalents may be employed in practicing the invention and it is not intended to limit the scope thereof except by the terms of the appended claims.

I claim:

1. A gauge slide for a beam or the like comprising a flattened tubular main body portion, a pivot lock bar within said main body portion apertured at one end thereof to accommodate a pivot pin, a pivot pin near one end of said slide fixed through the said main body portion and impaling said lock bar, a set screw through the edge of said slide nearest said lock bar substantially centered between the ends thereof adapted to urge the said pivot lock bar in fixed relationship against the edge of said beam, the said aperture through said pivot lock bar being substantially larger than the pivot pin whereby to assure uniform edge to edge contact of said lock bar against an edge of said beam.

2. A gauge slide for a beam or the like comprising a flattened tubular main body portion, a filler fixed in said flattened tubular main body portion slightly thicker than said beam, a pivot lock bar within said main body portion apertured at one end thereof to accommodate a pivot pin, a pivot pin near one end of said slide fixed through the said main body portion and impaling said lock bar, a nib brazed on the edge of said slide nearest said lock bar substantially centered between the ends thereof, a set screw threaded through said nib and the edge of said main body portion adapted to urge the said pivot lock bar in fixed relationship against the edge of said beam, the said aperture through said pivot lock bar being substantially larger than the pivot pin whereby to assure uniform edge to edge contact of said lock bar against an edge of said beam.

3. A gauge slide for a beam or the like comprising a flattened tubular main body portion having a portion of one side thereof cut away forming a pair of looped ends, a T-shaped filler fixed in said flattened tubular main body portion slightly thicker than said beam spanning between said looped ends, a pivot lock bar within said main body portion apertured at one end thereof to accommodate a pivot pin, a pivot pin near one end of said slide fixed through the said main body portion and impaling said lock bar, a nib brazed on the edge of said slide nearest said lock bar substantially centered between the ends thereof, a set screw threaded through said nib and the edge of said main body portion adapted to urge the said pivot lock bar in fixed relationship against the edge of said beam, the said aperture through said pivot lock bar being substantially larger than the pivot pin whereby to assure uniform edge to edge contact of said lock bar against an edge of said beam, and a vernier member fixed to said T-shaped filler member with the scale edge thereof positioned to overlap a beam or the like over which the said slide is telescoped.

MICHEAL MAGYARI.